US011795536B2

(12) United States Patent
Thomsen, III et al.

(10) Patent No.: US 11,795,536 B2
(45) Date of Patent: Oct. 24, 2023

(54) METHOD OF COATING HIGH ATOMIC NUMBER METALS ONTO OXYGEN OR HYDROXYL RICH SURFACES

(71) Applicant: UNITED STATES OF AMERICA AS REPRESENTED BY THE ADMINISTRATOR OF NASA, Washington, DC (US)

(72) Inventors: Donald L. Thomsen, III, Yorktown, VA (US); Sankara N. Sankaran, Yorktown, VA (US); Joel A. Alexa, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 16/938,177

(22) Filed: Jul. 24, 2020

(65) Prior Publication Data

US 2021/0025047 A1 Jan. 28, 2021

Related U.S. Application Data

(60) Provisional application No. 62/878,057, filed on Jul. 24, 2019.

(51) Int. Cl.
*C23C 4/08* (2016.01)
*C23C 4/02* (2006.01)
*C23C 4/134* (2016.01)
*B32B 15/04* (2006.01)

(52) U.S. Cl.
CPC .............. *C23C 4/08* (2013.01); *B32B 15/043* (2013.01); *C23C 4/02* (2013.01); *C23C 4/134* (2016.01)

(58) Field of Classification Search
CPC .............. C23C 4/08; C23C 4/134; C23C 4/02
See application file for complete search history.

(56) References Cited

U.S. PATENT DOCUMENTS

| 8,661,653 B2 * | 3/2014 | Thomsen, III ......... H05K 13/00 29/602.1 |
| 2012/0023737 A1 * | 2/2012 | Thomsen, III .......... C23C 28/00 29/592.1 |

OTHER PUBLICATIONS

D. Tejero-Martin et al., "Beyond Traditional Coatings: A Review on Thermal-Sprayed Functional and Smart Coatings", Journal of Thermal Spray Tech, Apr. 9, 2019, pp. 598-644, vol. 28.

* cited by examiner

*Primary Examiner* — Nathan T Leong
(74) *Attorney, Agent, or Firm* — Shawn P. Gorman; Robin W. Edwards; Trenton J. Roche

(57) ABSTRACT

Methods for making layered materials and layered materials including high atomic number metals and metal alloys adhered to surfaces are provided. Such surfaces may be oxygen or hydroxyl rich surfaces. Certain methods include depositing a tie down layer of a first metal or metal alloy particles onto a first surface of base material and depositing a high atomic number metal or metal alloy layer onto the first surface after depositing the tie down layer, wherein particles comprising the high atomic number metal or metal alloy layer have a higher atomic number than the first metal or metal alloy particles.

15 Claims, 7 Drawing Sheets

METHOD OF COATING HIGH ATOMIC NUMBER METALS ONTO OXYGEN OR HYDROXYL RICH SURFACES

CROSS-REFERENCE TO RELATED PATENT APPLICATION(S)

This patent application claims the benefit of and priority to 62/878,057, filed on Jul. 24, 2019, the contents of which are hereby incorporated by reference in their entirety for any and all non-limited purposes.

STATEMENT REGARDING FEDERALLY SPONSORED RESEARCH OR DEVELOPMENT

The invention described herein was made in the performance of work under a NASA contract and by an employee of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

Layering of dissimilar materials on one another through deposition or diffusion bonding requires a strong interface between the dissimilar materials for a resulting layered material to have good adhesion and mechanical strength at the interface. High atomic number materials, such as metals and alloys, have a tendency to make brittle oxides at oxygen rich metal and carbon surfaces. For example, high atomic number metals often form brittle surface oxides when coated on oxygen and hydroxyl rich surfaces. As such, high atomic number materials, such as metals and alloys, have presented problems when used in forming layered materials, especially layered materials where dissimilar materials interface with one another. One example of such poor adhesion, is the poor adhesion typically experienced with the layering of a refractory metal onto glass fiber. As a specific example, when tantalum (Ta) is radio frequency plasma sprayed onto glass fabric using current methods, the Ta easily flakes off of the glass fabric during cutting, handling, and folding of the glass fabric.

While some high atomic number metals have been shown to bond strongly to carbon fiber fabric under certain conditions, bonding of high atomic number metals or metal alloys to oxygen rich surfaces, such as glass fabrics, has presented significant challenges. For example, tantalum (Ta) has been shown to bond strongly to carbon fiber fabric and this strong adhesion can be attributed to the tantalum carbon bonding to form carbides. In comparison, tantalum has been shown to bond poorly with oxygen rich surfaces, such as glass fabric. The tantalum easily flakes off of the glass fabric during cutting, handling, and folding of the glass fabric. Without being bound of any specific of potentially numerous problems facing the art, the poor adhesion of tantalum with oxygen rich surfaces, such as glass fabric, could be attributed to the formation of brittle oxides having inferior adhesion.

Accordingly, embodiments disclosed herein address one or more deficiencies in the art.

BRIEF SUMMARY

Aspects disclosed herein provide methods to improve the adhesion of high atomic number metals and alloys to various surfaces, such as for example, oxygen or hydroxyl rich surfaces, inclusive of but not limited to: such as oxygen or hydroxyl rich metal surfaces, oxygen or hydroxyl rich films, and/or oxygen or hydroxyl rich fabrics.

Various embodiments may be wholly or partially be implemented in the making of a layered material. Various embodiments may include depositing a tie down layer of a first metal or metal alloy particles onto a first surface of base material and depositing a high atomic number metal or metal alloy layer onto the first surface after depositing the tie down layer.

Further aspects relate to layered materials. Novel layered materials may include a base material having an oxygen or hydroxyl rich first surface and a high atomic number metal or metal alloy layer bonded to the first surface at an interface, wherein the interface includes particles of a metal or metal alloy of a lower atomic number metal.

Various embodiments may include metal tie down layers of metal or metal alloy particles, such as metal tie down layers formed from titanium, palladium, tin, bismuth-tin alloy, antimony-tin alloy, molybdenum, molybdenum alloy, palladium alloy, aluminum, aluminum alloy, antimony, antimony alloy, titanium alloy, iron, iron alloy, and/or copper-tin alloy. Various embodiments may include high atomic number metal or metal alloy layers deposited after the metal tie down layers, such as high atomic number metal or metal alloy layers formed from tantalum, tantalum alloy, tungsten, tungsten alloy, lead, lead alloy, bismuth, and/or bismuth alloy.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
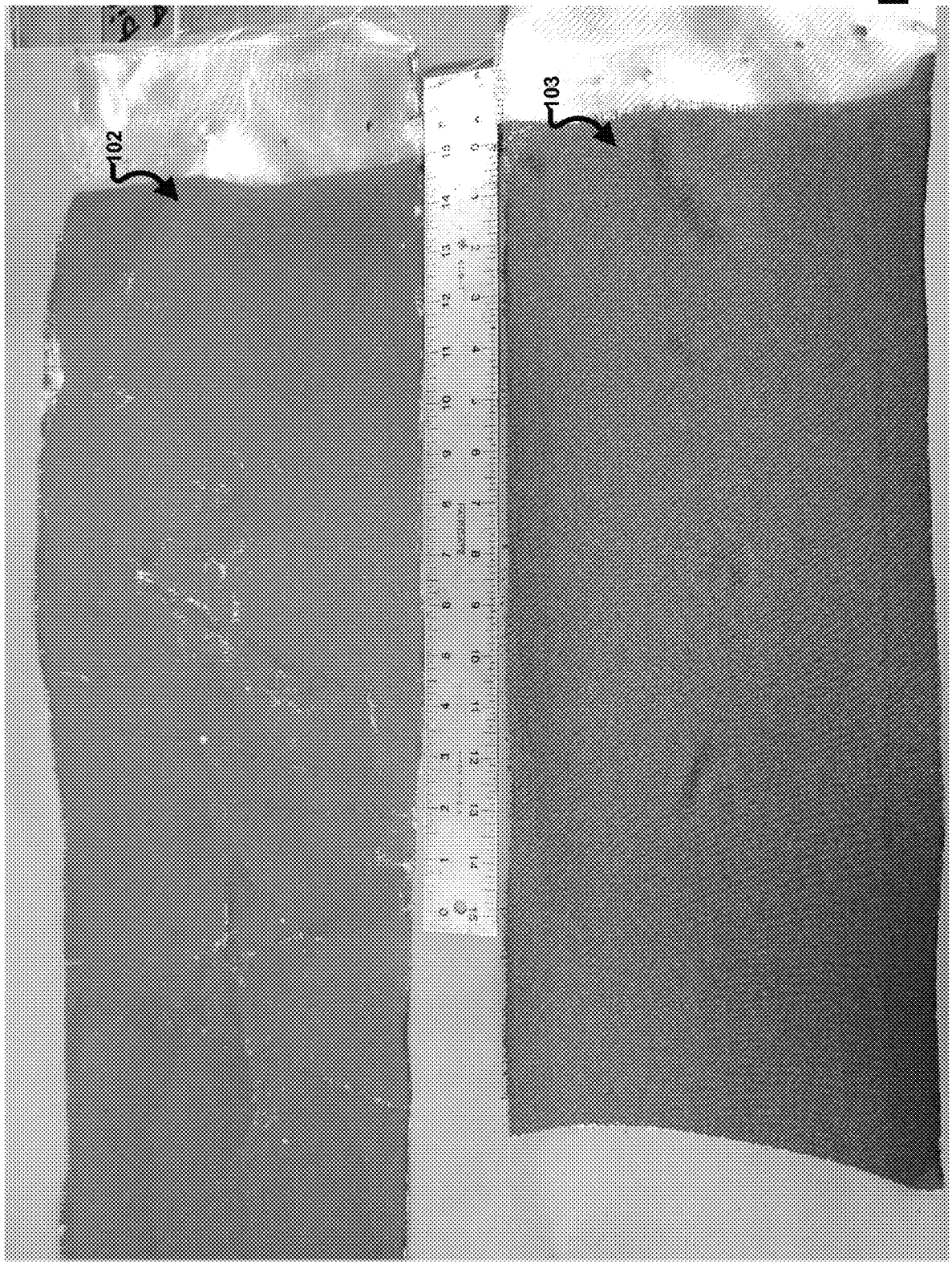
FIG. 1 is a photograph showing a comparison of a sample radio frequency (RF) plasma sprayed tantalum (Ta) coated glass fiber fabric without a tie down layer to an embodiment sample RF plasma sprayed Ta coated glass fiber fabric with a RF plasma sprayed tie down layer of Titanium (Ti).

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Generally, the term "about" as used herein unless specified otherwise is meant to encompass a variance or range of ±10%, the experimental or instrument error associated with obtaining the stated value, and preferably the larger of these.

As used herein the term "high atomic number" refers to a chemical element with an atomic number (or proton number) of 72 or greater. As used herein, chemical elements with an atomic number (or proton number) of less than 72 refers to as having a "low atomic number" or "lower atomic number."

Various novel embodiments disclosed herein provide methods to improve the adhesion of high atomic number metals and alloys to surfaces, such as oxygen or hydroxyl rich surfaces, including but not limited to: metal surfaces, films, fabrics, amongst others. Various embodiments provide methods to enable adhesion of high atomic number metals and alloys to glass surfaces, such as glass fiber fabrics. Various embodiments provide methods to enable adhesion of high atomic number metals and alloys to polymeric surfaces, such as polymeric fabrics, such as Nomex®, Kevlar®, cotton, nylons, and polyesters, which have hydroxy, carboxyl, amino, ketyl functional groups on the surface.

Various embodiments use a lower atomic number metal as a tie down, or as an adhesion promoter, thereby reducing oxide formation at the high atomic number metal interface. Various embodiments use lower atomic number metals coated onto oxygen and/or hydroxyl rich surfaces before the oxygen and/or hydroxyl rich surfaces are coated with high atomic number metals and/or metal alloys. Various embodiments use lower atomic number metals coated onto to glass surfaces, such as glass fiber fabrics, before the glass surfaces, such as glass fiber fabrics, are coated with high atomic number metals and/or metal alloys. Various embodiments use lower atomic number metals coated onto to polymeric surfaces, such as polymeric fabrics, such as Nomex®, Kevlar®, cotton, nylons, and polyesters, which have hydroxy, carboxyl, amino, ketyl functional groups on the surface, before the polymeric surfaces are coated with high atomic number metals and/or metal alloys. The coating of the oxygen and/or hydroxyl rich surfaces with lower atomic number metals prior to coating with the high atomic number metals and/or metal alloys may form stronger mechanical interfaces on oxygen and/or hydroxyl rich surfaces, such as metal surfaces, films, and fabrics. As such, various embodiments may enable the formation of layered materials having strong adhesion between a high atomic number metal and/or metal alloy layer and an oxygen and/or hydroxyl rich layer. As a specific example, various embodiments may enable formation of a strongly adhesively bonded tantalum coated glass fiber fabric. The embodiment strongly adhesively bonded tantalum coated glass fiber fabric may include a metal tie down layer, such as a lower atomic number metal tie down layer of titanium (Ti), palladium (Pd), etc., at the interface of the tantalum and glass fiber fabric. The use of the tie down metal layer with high atomic number metals in various embodiments enables methods to surface coat fabrics with high atomic number metals.

In various embodiments, a lower atomic number metal tie down layer (also referred to as a strike layer) may be deposited onto a surface, such as an oxygen and/or hydroxyl rich surface, to promote adhesion of a higher atomic number metal or metal alloy layer to the surface, such as the oxygen and/or hydroxyl rich surface. In various embodiments, the metal tie down layer, may be a thin metal tie down layer that enables a higher atomic number metal to bond to the metal by forming an inter-metallic or diffusion bond, having greater adhesion. In various embodiments, the metal tie down layer may be a layer of titanium (Ti), a layer of titanium alloy, a layer of palladium (Pd), a layer of tin (Sn), a layer of bismuth (Bi)-tin (Sn) alloy (Bi—Sn), a layer of antimony (Sb)-tin (Sn) alloy (Sb—Sn), a layer of molybdenum (Mo), a layer of molybdenum alloy, a layer of aluminum (Al), a layer of aluminum alloy, a layer of antimony (Sb), a layer of antimony alloy, a layer of palladium alloy, a layer of iron (Fe), a layer of iron-alloy (e.g., iron-molybdenum alloy, iron-copper alloy, stainless steel, etc.), and/or a layer of copper (Cu)-tin (Sn) alloy (Cu—Sn). Titanium and palladium have strong adhesive properties and form strong oxide bonds for use as a tie down or strike layer. Both titanium and palladium can be used to alloy with high atomic number materials. Titanium alloys and palladium alloys also show strong adhesion with different metals. As one specific example, the titanium alloy Ti-6Al-4V may be used to form the metal tie down layer. Palladium and tin (Sn) can be used as an alloying tie down layer for plating. Titanium has a useful property with diffusing oxygen away from its surface during diffusion bonding to itself or other metals. Thus, tantalum, and other high atomic number metals, form a strong interface with titanium by diffusion bonding. Additionally, alloys of bismuth and tin, alloys of antimony and tin, molybdenum, and molybdenum alloys may provide radiation shielding properties that may be beneficial for use in a tie down layer.

Various embodiments may use a metal tie down layer that may enable the preparation of a strongly adhesively bonded tantalum coated glass fiber fabrics. One such embodiment may be used to prepare hybrid composites through fiberglass processing with resins, such as vacuum assisted resin transfer molding, etc. In another embodiment, a strongly adhesively bonded tantalum coated glass fiber fabric may also be coated with a thin flexible or elastomeric adhesive to form a flexible cloth material. Various embodiments may use a metal tie down layer that may enable the preparation of a strongly adhesively bonded high atomic number metal or metal alloy (e.g., tantalum, tantalum alloy, tungsten, tungsten alloy, lead, lead alloy, bismuth, bismuth alloy, etc.) coated glass fiber fabrics. Such an embodiment of a strongly adhesively bonded high atomic number metal or metal alloy (e.g., tantalum, tantalum alloy, tungsten, tungsten alloy, lead, lead alloy, bismuth, bismuth alloy, etc.) coated glass fiber fabric may be used to prepare hybrid composites through fiberglass processing with resins, such as vacuum assisted resin transfer molding, etc. Such an embodiment of a strongly adhesively bonded high atomic number metal or metal alloy (e.g., tantalum, tantalum alloy, tungsten, tungsten alloy, lead, lead alloy, bismuth, bismuth alloy, etc.) coated glass fiber fabric may also be coated with a thin flexible or elastomeric adhesive to form a flexible cloth material.

Various embodiments may enable coating of glass fiber fabrics and other polymeric fabrics, such as Nomex®, Kevlar®, cotton, nylons, and polyesters, which have hydroxyl, carboxyl, amino, ketyl functional groups on the surface, using a spray system, such as a thermal spray system. Examples of thermal spray systems suitable for use with the various embodiments may include RF plasma spray system, wire arc systems, flame based systems, kinetic systems, etc. Various embodiments enable delivery of coated high atomic metals and/or allows on fabrics using a spray process, such as a thermal spray process (e.g., RF plasma spray process, a flame process, a kinetic process, a wire arc process, etc.). Various embodiments may enable the formation of high atomic number metal layers on a flexible fabric.

FIG. 1 is a photograph showing a comparison of a sample radio frequency (RF) plasma sprayed tantalum (Ta) coated glass fiber fabric 102 without a tie down layer to an embodiment sample RF plasma sprayed Ta coated glass fiber fabric 103 with a RF plasma sprayed tie down layer of Titanium (Ti) in accordance with the embodiments. In FIG. 1, the top fabric 102 is a RF plasma sprayed tantalum coated glass fiber fabric. The bottom fabric 103 is a RF plasma sprayed tantalum coated glass fiber fabric with a RF plasma sprayed tie down layer according to the various embodiments. The top fabric 102 has flaking metal at folded and cut areas. The bottom fabric 103 does not appear to have flaking areas at the edges or in areas that had been folded or handled.

Figure 2:
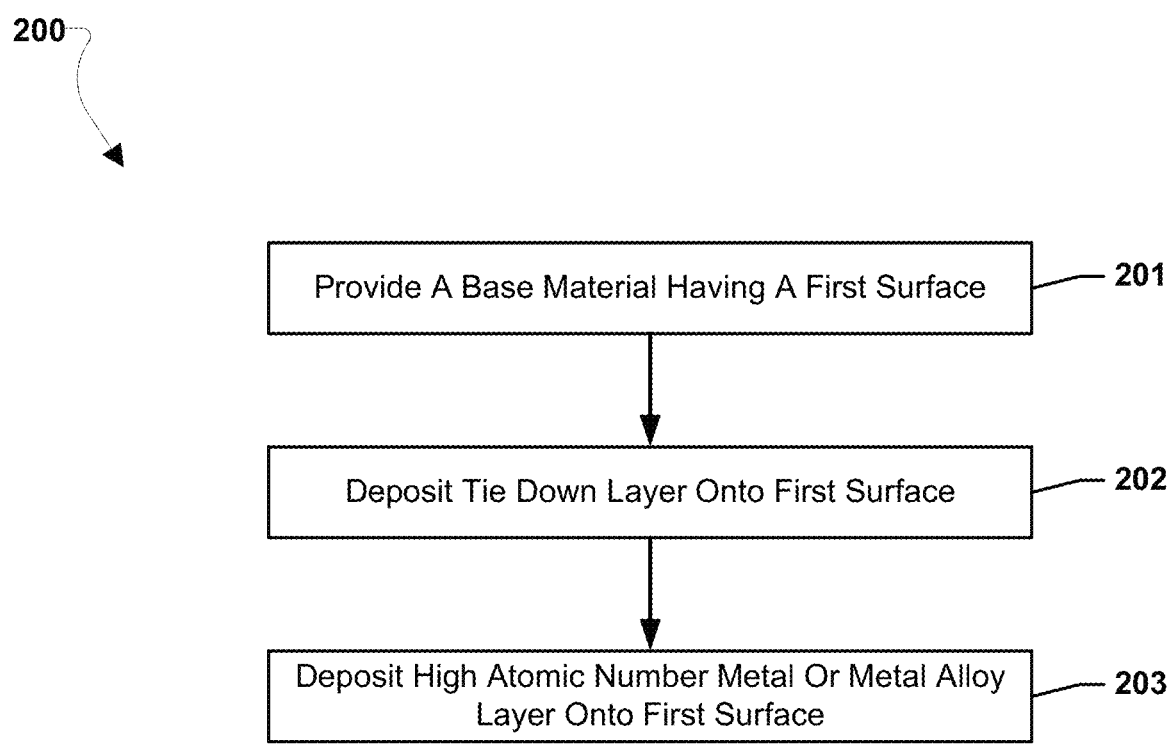
FIG. 2 is a process flow diagram that may be partially or wholly implemented in the formation of a layered material having strong adhesion between a high atomic number metal and/or metal alloy layer and an oxygen and/or hydroxyl rich layer using a lower atomic number metal tie down layer in accordance with one embodiment.

FIG. 2 is an illustrative process flow diagram 200 that may be partially or wholly implemented in the formation of a layered material. The operations of flow diagram 200 may be implemented to form a layered material having strong adhesion between a high atomic number metal and/or metal alloy layer and an oxygen and/or hydroxyl rich layer using a lower atomic number metal tie down layer in accordance with certain embodiments. The layered material formed by operations provided within process flow 200 may be used as an input material in preparing subsequent articles, such as hybrid composites, flexible cloths, etc.

In block 201, a base material having a first surface may be provided. The first material may be a material (e.g., a fabric, a film, a sheet, etc.) with a first surface that is an oxygen or hydroxyl rich surface. The base material may be a glass material, such as a glass fabric. The base material may be a polymeric fabric, such as Nomex®, Kevlar®, cotton, nylon, or polyester, which has hydroxy, carboxyl, amino, ketyl functional groups on the surface.

In block 202, a tie down layer may be deposited onto the first surface of the base material. The tie down layer may be metal or metal alloy particles deposited onto the first surface. In various embodiments, the tie down layer may be deposited by spraying, such as by thermal spraying (e.g., RF plasma spraying, flame spraying, kinetic spraying, wire arc spraying, or other techniques). In some embodiments, the spraying process, such as RF plasma spraying, etc., may melt the outer layer of the base material during the deposition process. In various embodiments, the tie down layer may be a thin layer deposited on the first surface. As an example, the thin layer may be about 1 millimeter (mil) thick. As an example, the thin layer may be about a thickness equal to the particle diameter of the material being deposited to form the tie down layer. As such, the thin layer may be a single particle layer of the tie down layer material, such as a lower atomic number metal. In various embodiments, the tie down layer may be a lower atomic number metal or metal alloy deposited on the first surface. As examples, the metal tie down layer may be a layer of titanium (Ti), a layer of palladium (Pd), a layer of tin (Sn), a layer of bismuth (Bi)-tin (Sn) alloy (Bi—Sn), a layer of antimony (Sb)-tin (Sn) alloy (Sb—Sn), a layer of molybdenum (Mo), a layer of molybdenum alloy, a layer of titanium alloy, a layer of aluminum (Al), a layer of aluminum alloy, a layer of antimony (Sb), a layer of antimony alloy, a layer of palladium alloy, a layer of iron (Fe), a layer of iron-alloy (e.g., iron-molybdenum alloy, iron-copper alloy, stainless steel, etc.), and/or a layer of copper (Cu)-tin (Sn) alloy (Cu—Sn). In some embodiments, the deposition of the tie down layer in block 202 may be a multiple part deposition process having an initial deposition of particles followed by one or more subsequent depositions of additional particles. In some embodiments, the tie down layer may be formed by depositing one type of metal or metal alloy particles in an initial deposition and another type of metal or metal alloy particles in a subsequent deposition to form a tie down layer of two or more different type metal or metal alloy particles. For example, particles of titanium, palladium, tin, bismuth-tin alloy, antimony-tin alloy, molybdenum, molybdenum alloy, titanium alloy, aluminum, aluminum alloy, antimony, antimony alloy, palladium alloy, iron alloy, or copper-tin alloy may be deposited in an initial deposition part of step 202 and different particles of titanium, palladium, tin, bismuth-tin alloy, antimony-tin alloy, molybdenum, molybdenum alloy, titanium alloy, aluminum, aluminum alloy, antimony, antimony alloy, palladium alloy, iron alloy, or copper-tin alloy may be deposited in one or more subsequent deposition parts of step 202 to form a tie down layer of at least two different type metal or metal alloy particles. As a specific example, palladium particles may be deposited in an initial deposition as part of block 202 and then tin particles may be deposited in a subsequent deposition as part of block 202 and/or another process(es). Such a specific example of depositing palladium particles followed by depositing tin particles to form the tie down layer may be useful when the high atomic number material to be deposited will be bismuth. As another specific example, when the high atomic number material to be deposited will be bismuth, the tie down layer may be formed, such as part of block 202, by depositing bismuth-tin alloy particles or antimony-tin alloy particles.

A high atomic number metal or metal alloy layer may be deposited onto the first surface (such as for example, at block 203). The high atomic number metal or metal alloy layer may be deposited onto the first surface after depositing the tie down layer onto the first surface. In various embodiments, the subsequent high atomic number metal or metal alloy layer may be deposited by spraying, such as thermal spraying (e.g., RF plasma spraying, flame spraying, kinetic spraying, wire arc spraying, or other techniques.). In some embodiments, the spraying, such thermal spraying (e.g., RF plasma spraying, or other techniques), may melt the outer layer of the base material and/or the tie down layer during the deposition process. As an example, the high atomic number metal or metal alloy layer may be a layer of tantalum (Ta) or tantalum alloy. As another example, the high atomic number metal or metal alloy layer may be a layer of tungsten (W) or tungsten alloy. As a still further example, the high atomic number metal or metal alloy layer may be a layer of lead (Pb) or lead alloy. As yet another example, the high atomic number metal or metal alloy layer may be a layer of bismuth (Bi) or bismuth alloy (e.g., bismuth alloy including tin, bismuth alloy including antimony, etc.). The high atomic number metal or metal alloy layer may form a strong adhesive bond by inter-metallic or diffusion bonding. The resulting material may be a multilayer material of the first material adhesively bonded with the high atomic number metal or metal alloy using the tie down layer. The high atomic metal or metal alloy layer may be formed from particles of metal or metal alloy having a high atomic number that is higher than the atomic number of the particles of metal or metal alloy deposited to form the tie down layer. As such, the tie down layer may be formed of particles of lower atomic number metal or metal alloy and the high atomic number metal or metal alloy layer may be formed of particles of higher atomic number metal or metal alloy.

As a specific example, one or more operations of flow diagram 200 may result in a RF plasma sprayed tantalum coated glass fiber fabric with a RF plasma sprayed tie down layer of titanium. A RF plasma sprayed titanium layer may be deposited onto glass fiber fabric for use as a tie down or strike layer for a subsequent RF plasma sprayed tantalum layer. The RF plasma sprayed titanium layer tie down layer may be about 1 mil thick or equivalent to a thin layer of the titanium. The initial titanium powder may be about the thickness of the average particle diameter, or slightly greater. This thin surface allows the tie down with the minimal amount of titanium. The subsequent RF plasma sprayed tantalum forms a strong adhesive bond by inter-metallic or diffusion bonding. As such, the resulting layered material has a strong adhesive bond at the interface between the high atomic number metal or metal alloy layer and the first surface of the base material because the particles of the metal or metal alloy of the tie down layer are present at the interface supporting the inter-metallic or diffusion bonding.

Figure 3:
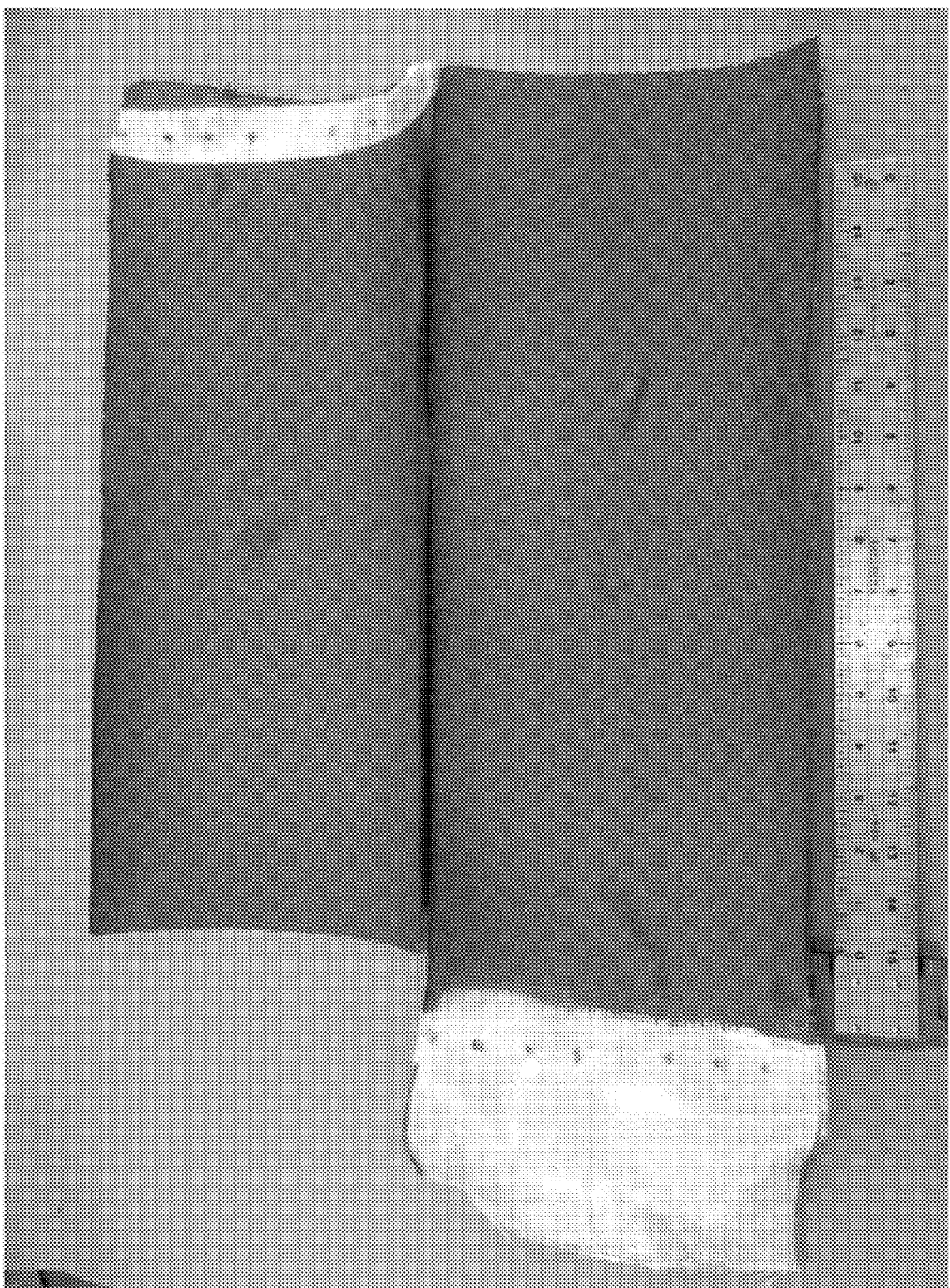
FIG. 3 is a photograph of two samples of RF plasma sprayed Ta coated glass fiber fabric with a RF plasma sprayed tie down layer of Ti in accordance with an embodiment.
Figure 4:
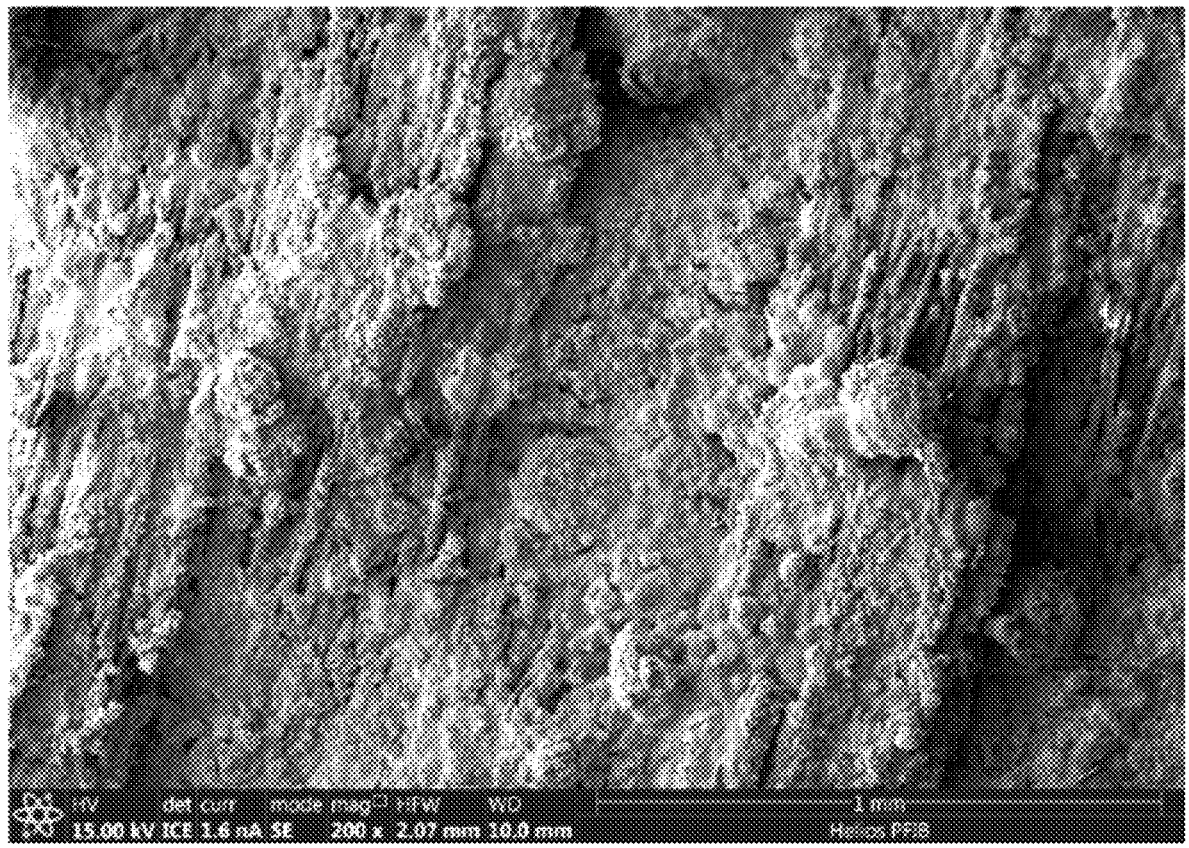
FIG. 4 is a scanning electron microscope (SEM) image of a Ta/Ti glass fabric surface in accordance with an embodiment.
Figure 5:
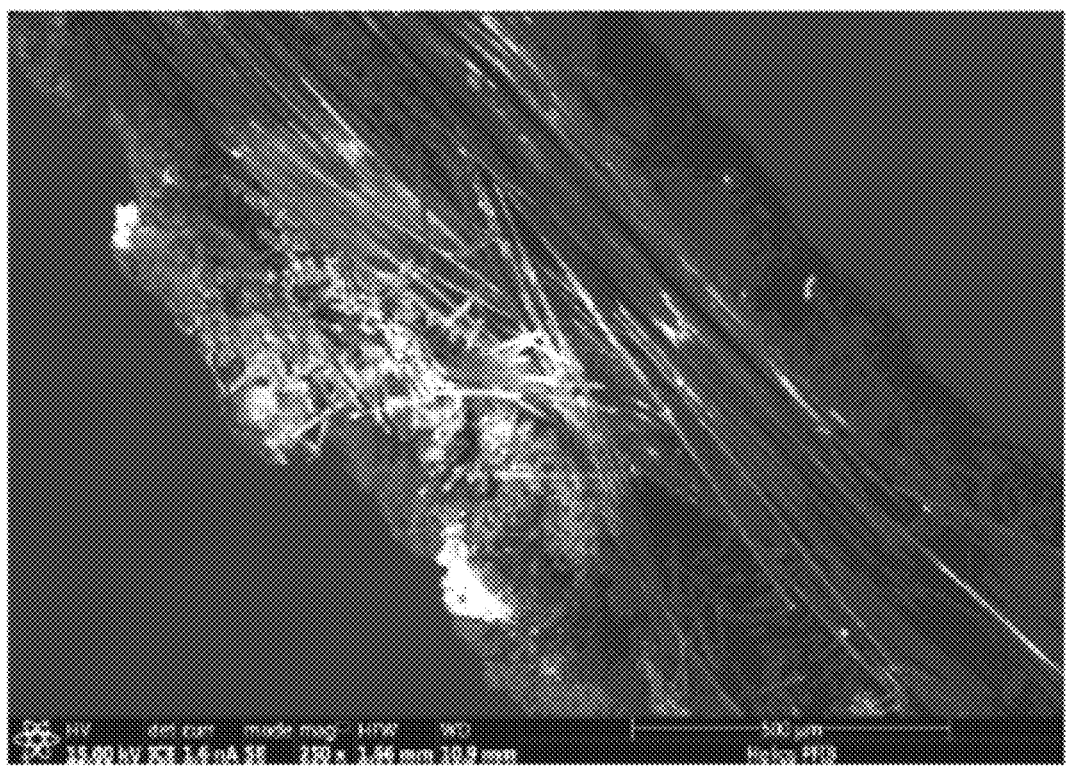
FIG. 5 is a SEM image of a cross-section of the Ta/Ti glass fabric of FIG. 4.
Figure 6:
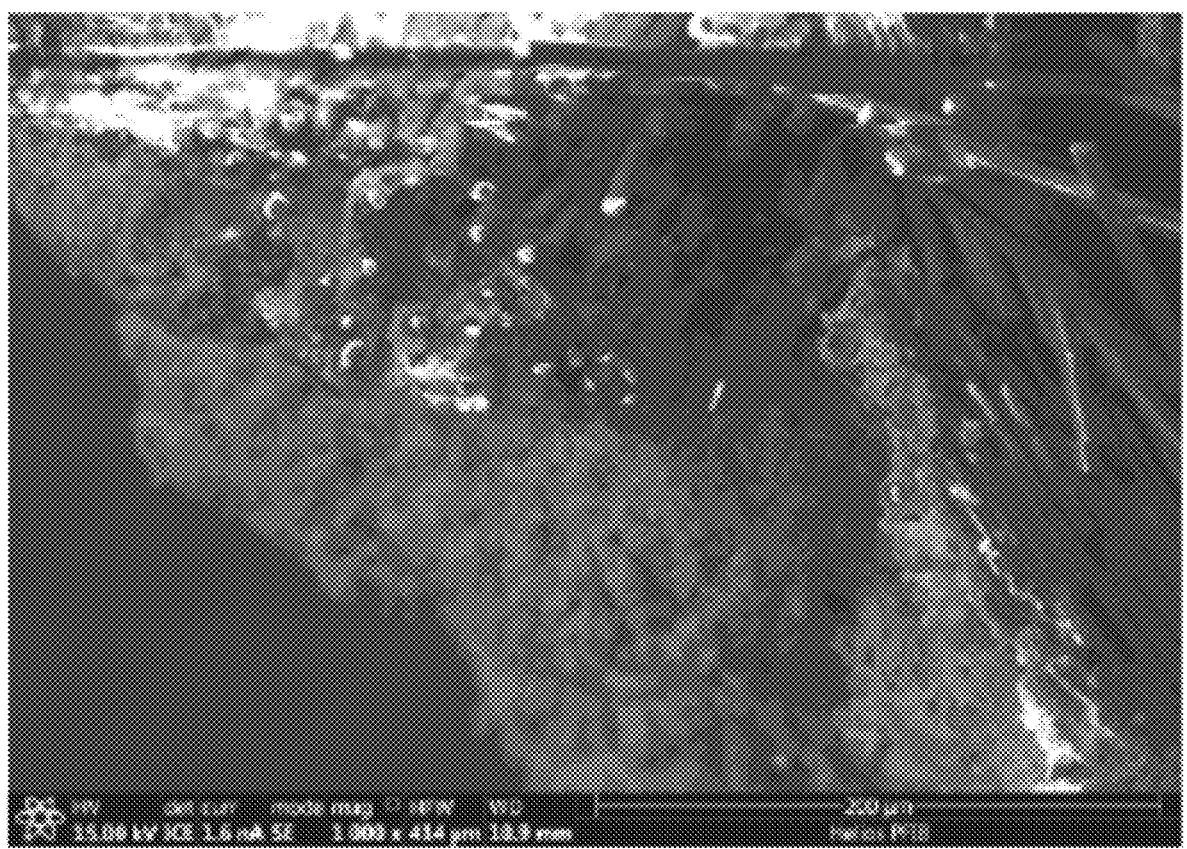
FIG. 6 is another SEM image of a cross-section of the Ta/Ti glass fabric of FIG. 4.
Figure 7:
FIG. 7 is a SEM image of a cross-section of an individual glass fiber of the Ta/Ti glass fabric of FIG. 4.

FIG. 3 is a photograph of two samples of RF plasma sprayed tantalum coated glass fiber fabric with a RF plasma sprayed tie down layer of titanium in accordance with an embodiment. The two samples in FIG. 3 were formed according to an operations incorporating teachings of flow diagram 200. FIG. 4 is a scanning electron microscope (SEM) image of a Ta/Ti glass fabric surface in accordance with an embodiment. FIG. 4 shows the Ta/Ti glass fabric surface at a 200× magnification. The Ta/Ti glass fabric surface of FIG. 4 was formed according to teachings of flow diagram 200. FIG. 5 is a SEM image of a cross-section of the Ta/Ti glass fabric shown in FIG. 4 at a 250× magnification. FIG. 6 is another SEM image of a cross-section of the Ta/Ti glass fabric shown in FIG. 4 at a 1000× magnification. FIG. 7 is a SEM image of a cross-section of an individual glass fiber of the Ta/Ti glass fabric shown in FIG. 4 at a 20000× magnification.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for making a layered material, comprising:
   depositing a tie down layer comprising particles of at least one of titanium or a titanium alloy onto a first surface of base material, the base material comprising a glass fabric; and
   depositing a high atomic number metal layer onto the first surface after depositing the tie down layer comprising particles of at least one of tantalum or a tantalum alloy.

2. The method of claim 1, wherein at least one of the depositing of the tie down layer and the depositing of the high atomic number metal layer comprises a thermal spraying process.

3. The method of claim 2, wherein the thermal spraying process comprises a radio frequency (RF) plasma spraying process.

4. The method of claim 1, wherein the first surface of the base material is an oxygen or hydroxyl rich surface.

5. The method of claim 4, wherein the particles of the tie down layer further comprise a metal or an alloy selected from the group consisting of: palladium, tin, aluminum, aluminum alloy, antimony, antimony alloy, and combinations thereof.

6. The method of claim 4, wherein a thickness of the tie down layer is about a thickness of an average particle diameter of the particles of the tie down layer.

7. The method of claim 4, wherein a thickness of the tie down layer is about one millimeter.

8. The method of claim 1, wherein:
   the particles of the tie down layer further comprise at least one of: palladium, tin, bismuth-tin alloy, antimony-tin alloy, bismuth-tin-antimony alloy, molybdenum, molybdenum alloy, iron, iron alloy, and copper-tin alloy; and
   the particles comprising the high atomic number metal layer further comprise at least one of: tungsten, tungsten alloy, lead, and lead alloy.

9. A method for making a layered material, comprising:
   depositing a tie down layer comprising particles of at least one of titanium or a titanium alloy onto a first surface of base material, the base material comprising a glass fabric; and
   depositing a high atomic number metal layer onto the first surface after depositing the tie down layer comprising particles of at least one of tungsten, a tungsten alloy, bismuth, a bismuth alloy, lead, or a lead alloy.

10. The method of claim 9, wherein at least one of the depositing of the tie down layer and the depositing of the high atomic number metal layer comprises a thermal spraying process.

11. The method of claim 10, wherein the thermal spraying process comprises a radio frequency (RF) plasma spraying process.

12. The method of claim 9, wherein the first surface of the base material is an oxygen or hydroxyl rich surface.

13. The method of claim 12, wherein the particles of the tie down layer further comprise a metal or an alloy selected from the group consisting of: palladium, tin, aluminum, aluminum alloy, antimony, antimony alloy, and combinations thereof.

14. The method of claim 12, wherein a thickness of the tie down layer is about a thickness of an average particle diameter of the particles of the tie down layer.

15. The method of claim 12, wherein a thickness of the tie down layer is about one millimeter.

* * * * *